(12) United States Patent
Iwadate

(10) Patent No.: US 8,729,843 B2
(45) Date of Patent: May 20, 2014

(54) APPARATUS INCLUDING MOTOR

(75) Inventor: Yasuhiro Iwadate, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 427 days.

(21) Appl. No.: 13/256,312

(22) PCT Filed: Mar. 16, 2010

(86) PCT No.: PCT/JP2010/054904
§ 371 (c)(1),
(2), (4) Date: Sep. 13, 2011

(87) PCT Pub. No.: WO2010/107124
PCT Pub. Date: Sep. 23, 2010

(65) Prior Publication Data
US 2012/0001576 A1    Jan. 5, 2012

(30) Foreign Application Priority Data
Mar. 18, 2009  (JP) ................. 2009-066510

(51) Int. Cl.
*H02P 6/10* (2006.01)
(52) U.S. Cl.
USPC ............ 318/400.23; 318/400.14; 318/400.15; 318/432; 318/437; 318/799
(58) Field of Classification Search
USPC ............ 318/400.01, 400.07, 400.12, 400.14, 318/400.15, 400.23, 400.24, 560, 599, 778, 318/799, 800, 807, 809, 811, 432, 434, 318/437; 388/800, 805, 811, 812, 814, 842, 388/912, 930
See application file for complete search history.

(56) References Cited

U.S. PATENT DOCUMENTS

| 4,601,568 | A | 7/1986 | Takano | |
|---|---|---|---|---|
| 6,805,426 | B2 * | 10/2004 | Kokubo et al. | 347/19 |
| 6,838,855 | B2 * | 1/2005 | Kobayashi et al. | 318/800 |
| 2003/0117448 | A1 | 6/2003 | Kokubo | |

FOREIGN PATENT DOCUMENTS

| CN | 101330270 A | 12/2008 |
|---|---|---|
| JP | 2004-88926 A | 3/2004 |
| JP | 2005-178334 A | 7/2005 |
| JP | 2006-137053 A | 6/2006 |
| JP | 2006-256226 A | 9/2006 |
| JP | 2008-211869 A | 9/2008 |

* cited by examiner

*Primary Examiner* — Antony M Paul
(74) *Attorney, Agent, or Firm* — Canon USA, Inc. IP Division

(57) ABSTRACT

To suppress torque variation including various frequency components, a lot of measuring and adjusting operations are necessary, and this takes much time and trouble. An electronic apparatus includes a selection unit configured to select, on the basis of a threshold value relating to speed variation of the mechanism and threshold values relating to a plurality of frequencies that constitute the speed variation, a frequency to be measured and a frequency to be suppressed, from the plurality of frequencies, a generation unit configured to generate a periodic signal including the frequency to be suppressed that is selected by the selection unit, and an acquisition unit configured to output the periodic signal generated by the generation unit to the control unit and to acquire a parameter relating to the frequency included in the periodic signal.

5 Claims, 6 Drawing Sheets

| POSITION | PHASE | FIRST AMPLITUDE | SECOND AMPLITUDE | AMPLITUDE RATIO |
|---|---|---|---|---|
| Q1 | 2π × 1/6 | 2 | 2.1 | 1.05 |
| Q2 | 2π × 2/6 | 2.5 | 2.2 | 0.88 |
| Q3 | 2π × 3/6 | 3 | 2.3 | 0.77 |
| Q4 | 2π × 4/6 | 3.5 | 2.4 | 0.69 |
| Q5 | 2π × 5/6 | 4 | 6.4 | 1.6 |

| FREQUENCY | FIRST THRESHOLD VALUE | SECOND THRESHOLD VALUE |
|---|---|---|
| MOTOR COGGING 6-ORDER | 2.5 | 0.70 |
| MOTOR COGGING 12-ORDER | 2.1 | 0.60 |
| TIMING BELT | 1.3 | 0.90 |

APPARATUS INCLUDING MOTOR

TECHNICAL FIELD

The present invention relates to motor control in an apparatus including a motor, for example, a recording apparatus.

BACKGROUND ART

Inkjet recording apparatuses and image reading apparatuses are known as electronic apparatuses including motor control devices for driving motors. An inkjet recording apparatus scans a recording head by driving force of a motor, and an image reading apparatus scans a reading unit by driving force of a motor.

Driving force of the motor includes a so-called torque ripple (cogging torque). The torque ripple is transmitted to a carriage via a timing belt. While the moving speed of the carriage is controlled, for example, using a speed profile prepared beforehand, it is changed by the influence of the torque ripple. The cycle of occurrence of the torque ripple is determined by the structure of the motor. To remove the influence of the torque ripple, a feed forward (FF) control method for adding a signal for suppressing the torque ripples has been proposed.

In a recording apparatus disclosed in Japanese Patent Laid-Open No. 2005-178334, positions where torque variation occurs are measured by speed variation of a carriage, a correction table for correcting a speed driving command is generated, and the carriage is driven according to the correction table. In the correction table, a driving command value is set at a low value when the speed detected by an encoder is higher than a target speed, and at a high value when the detected speed is lower than the target speed.

However, the waveform of the torque ripple includes torque variation having various frequency components, and the frequency components are influenced by one another. Further, there are individual differences in the magnitude of the torque variation including the frequency components among electronic apparatuses even when the electronic apparatuses are of the same type. Therefore, even if the technique of the above publication is applied, it is necessary to perform many measuring and adjusting operations in order to suppress torque variation containing various frequency components, and this takes much time and trouble.

CITATION LIST

Patent Literature

PTL 1 Japanese Patent Laid-Open No. 2005-178334

SUMMARY OF INVENTION

The present invention provides an electronic apparatus that solves the above-described problems. An electronic apparatus according to an aspect of the present invention includes a motor configured to drive a mechanism; an encoder configured to output a signal in response to movement of the mechanism; a control unit configured to execute feedback control over driving of the motor according to the signal and a command value; a selection unit configured to select, on the basis of a threshold value relating to speed variation of the mechanism and threshold values relating to a plurality of frequencies that constitute the speed variation, a frequency to be measured and a frequency to be suppressed, from the plurality of frequencies; a generation unit configured to generate a periodic signal including the frequency to be measured that is selected by the selection unit and a periodic signal including the frequency to be suppressed that is selected by the selection unit; and an acquisition unit configured to output the periodic signal generated by the generation unit to the control unit and to acquire a parameter relating to the frequency included in the periodic signal.

DESCRIPTION OF EMBODIMENTS

Figure 1:
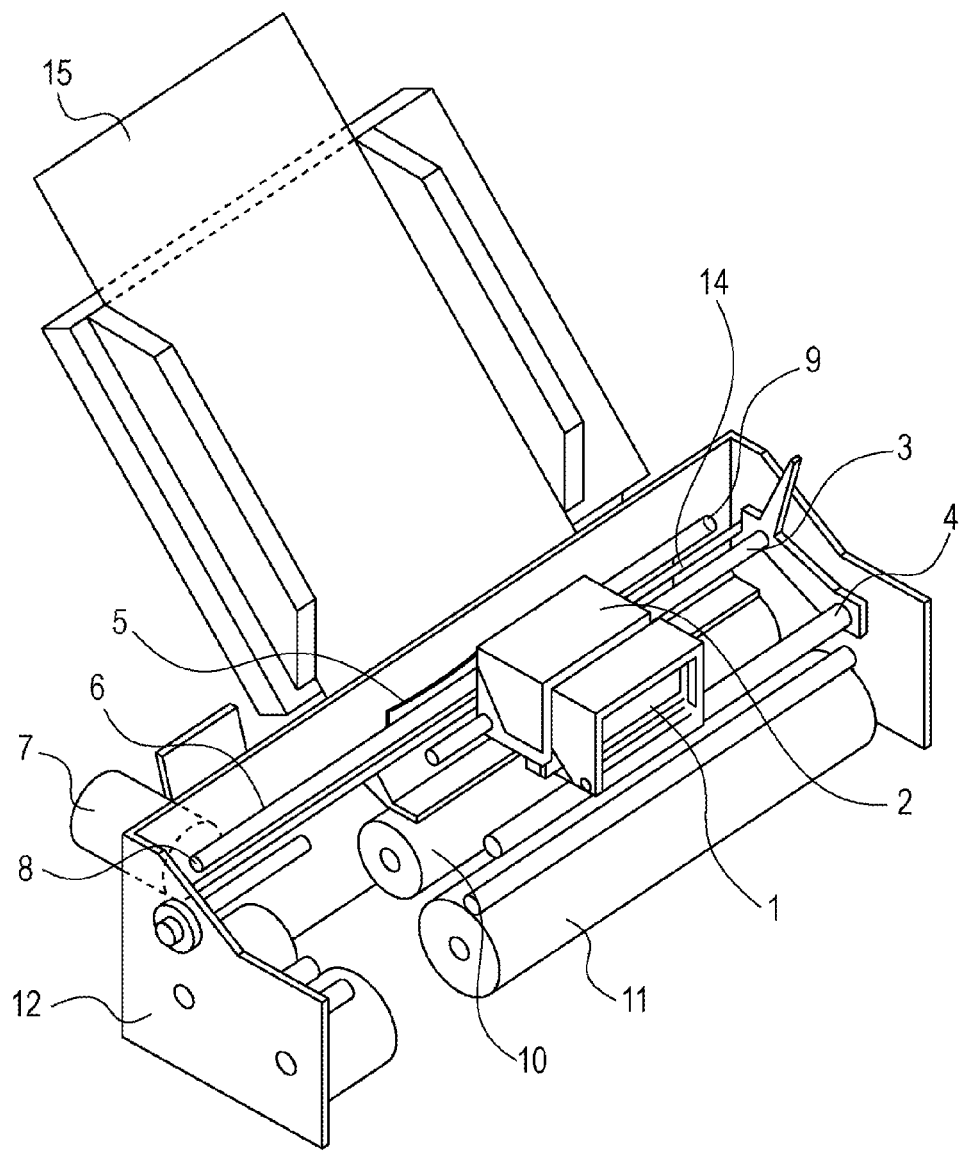
FIG. 1 is a perspective view of a recording apparatus.

FIG. 1 is a perspective view of a recording apparatus according to an example of an electronic apparatus. The recording apparatus includes the following components: A carriage 2 serves as a mechanism on which a recording head 1 for discharging ink is mounted. The carriage 2 is a moving body that scans (moves) while being guided and supported by a main guide rail 3 and a sub-guide rail 4. A flexible board 5 connects an electric connecting portion of a substrate provided in the carriage 2 to a control unit of a main substrate provided in the apparatus body. A timing belt 6 is laid between a motor pulley 8 connected to a motor 7 and a driven pulley 9 opposed to the motor pulley 8 in a tensioned state, and is fixed to the carriage 2. Driving force is transmitted from the motor 7 to the timing belt 6 via a mechanism such as gears, so that the carriage 2 scans over a recording medium (recording sheet). A conveying roller 10 is driven by a conveying motor so as to convey a recording medium. A discharge roller 11 discharges the recording medium out of the apparatus after image recording. The main guide rail 3, the sub-guide rail 4, etc. are fixed to a housing 12.

Figure 2:
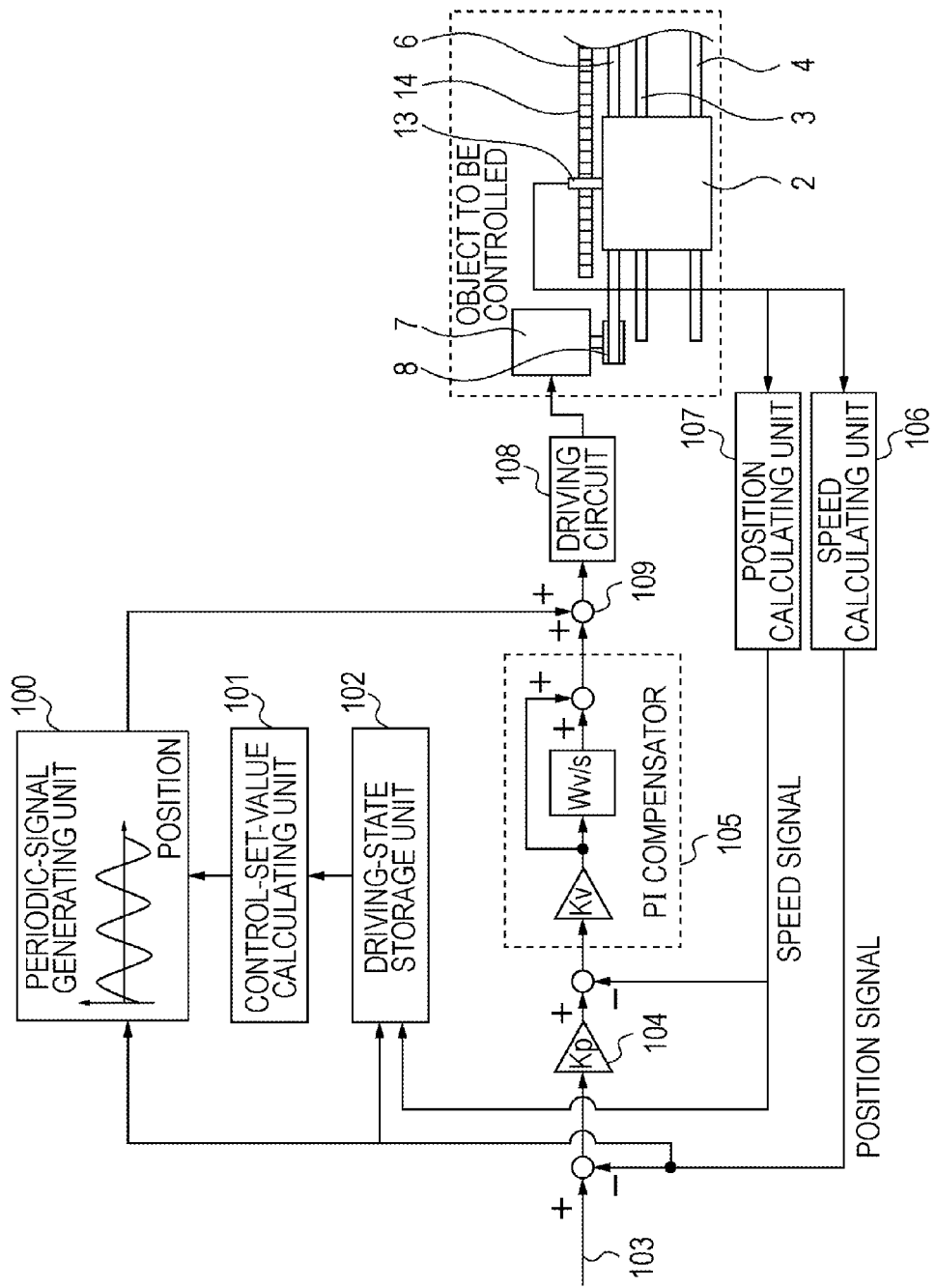
FIG. 2 is an explanatory view of a motor control circuit.

FIG. 2 is an explanatory view of a motor control circuit in the embodiment. While this motor control circuit is formed by an application specific integrated circuit (ASIC) as an example, some functions may be performed by a CPU. A drive command signal (command value) 103 is a driving profile of the carriage 2 that is programmably determined beforehand. A position calculating unit 106 and a speed calculating unit 107 respectively calculate (acquire) the position and speed of the carriage 2 from signals detected by an encoder sensor 13 with encoder slits 14. An operation unit 104 and an operation unit 105 carry out operation based on signals of the position and speed of the carriage 2 detected by the encoder sensor 13 so that driving of the carriage 2 follows the drive command signal 103, and output a signal obtained by the operation to a driving circuit 108. The operation unit 105 is a proportional integral (PI) compensator. With the above structures, feedback (FB) control is performed.

A signal generating unit (periodic-signal generating unit) 100 generates a periodic signal for suppressing periodic vibration caused in the motor 7. Using this signal, feed forward (FF) control is performed. This periodic signal is given by the following Expression (1):

Periodic signal=amplitude×sin(2×π×position signal/ periodic vibration pitch+phase) (1)

While the periodic signal is described as a sine wave, it may be a rectangular wave. In Expression (1), "position signal" refers to a signal of the position of the carriage 2 detected by the encoder sensor 13, and "periodic vibration pitch" refers to a spatial frequency of periodic vibration. For example, assuming that the number of teeth of the motor pulley 8 is designated as N (teeth) and the tooth pitch of the timing belt 6 is designated as M (mm), the feed amount of the timing belt 6 in one rotation of the motor 7 is given by N×M (mm). When periodic vibration includes a P-number of pulses in one rotation of the motor 7, the periodic vibration pitch is given by N×M/P (mm). Further, "amplitude" refers to an amplitude of the periodic signal output from the periodic-signal generating unit 100.

While the amplitude is expressed by the duty ratio (%) of pulse width modulation (PWM) in the embodiment, the present invention is not limited thereto. Further, "phase" refers to a phase of a periodic signal output from the periodic-signal generating unit 100. The origin of the position signal may be determined with a rotation angle origin sensor (not shown) attached to the motor 7 or an origin position detection sensor of the carriage 2. The periodic signal output from the periodic-signal generating unit 100 has parameters (amplitude, phase value, and frequency) for suppressing the speed variation (torque variation). Since the amplitude and phase vary according to manufacturing errors of the motor 7 and component errors and assembly of the recording apparatus, they need to be calculated for each recording apparatus.

Information for this calculation is acquired by an identification process (preliminary driving process) that will be described below. The signal generating unit 100 outputs a periodic signal according to information (parameter) about the periodic signal. When information about a periodic signal to be output is changed by a change of the apparatus state or switching of the operation mode, the signal generating unit 100 changes the number and type of periodic signals. For example, when the speed of the carriage 2 is a first speed, the signal generating unit 100 outputs periodic signals corresponding to a sixth-order motor cogging frequency and a frequency of the timing belt. When the speed of the carriage 2 is higher than the first speed, the signal generating unit 100 outputs a periodic signal corresponding to a twelfth-order motor cogging frequency.

The output from the operation unit 105 and the output from the signal generating unit 100 are added by an adder unit 109, and the sum is output to the driving circuit 108. After signal processing is performed by a PWM unit 108a and a motor driver 108b in the driving circuit 108, a control output is given to the motor 7. A driving-state storage unit 102 stores information about a position signal and a speed signal detected during driving of the carriage 2. A control-set-value calculating unit (control-set-value generating unit) 101 receives the information stored in the driving-state storage unit 102, and calculates (generates) parameters (set values) of periodic signals that can suppress periodic vibration. The signal generating unit 100 includes a frequency table that holds the parameters and flags. The signal generating unit 100 generates a periodic signal for a frequency corresponding an ON flag, with reference to the parameters. Hence, the signal generating unit 100 does not refer to the parameters for a frequency corresponding to an OFF flag.

Figure 6:
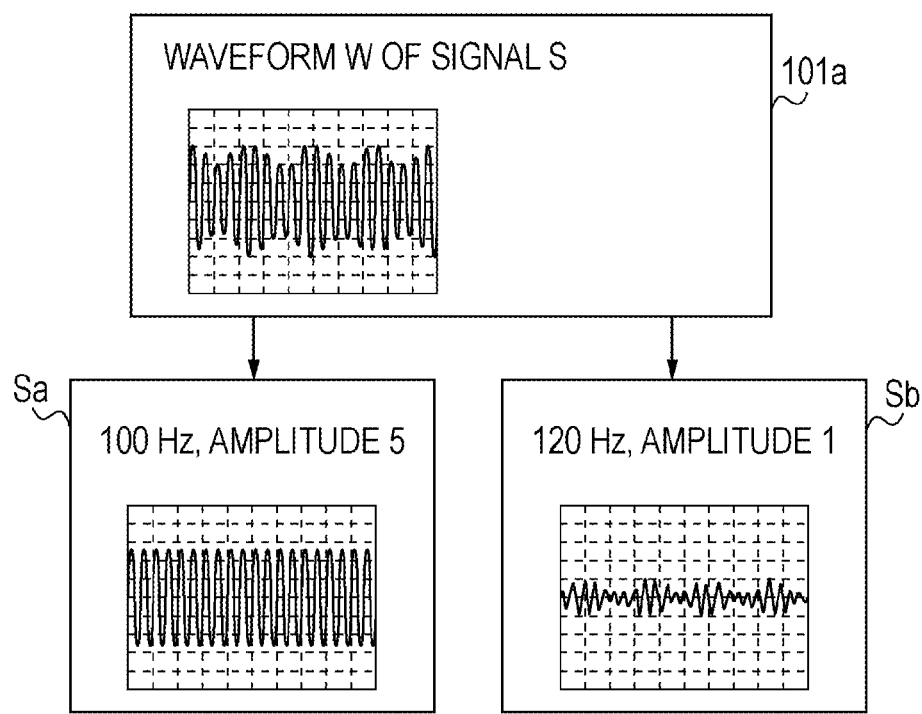
FIG. 6 illustrates extraction of frequencies of speed variation by a band-pass filter.

The control-set-value calculating unit 101 includes a band-pass filter 101a that serves to divide information about the speed variation into a plurality of frequency signals. For the signals obtained by division, parameters of periodic signals are calculated (acquired). FIG. 6 illustrates the function of the band-pass filter 101a. For example, when the band-pass filter 101a receives a signal S having a waveform W, it generates a signal Sa having a frequency of 100 Hz and an amplitude of 5, and a signal Sb having a frequency of 120 Hz and an amplitude of 1.

Next, a method for identifying torque variation will be summarized. In the embodiment, identification is performed for predetermined frequencies (e.g., three frequencies). For that purpose, it is determined, with reference to values in a threshold value table provided in the driving-state storage unit 102, which of the three frequencies is to be identified. In the threshold value table, threshold values are kept corresponding to the frequencies to be measured. When a frequency is specified by a threshold value, a parameter of a periodic signal capable of suppressing the speed variation is specified for each frequency. This specification result is set in the frequency table so as to be used in an actual printing operation of the apparatus. For this reason, the control unit of the electronic apparatus can execute an identification mode separately from a print mode. For example, the identification mode can be performed before the print mode. In the print mode, the signal generating unit 100 outputs a periodic signal during scanning of the carriage.

Figure 5:
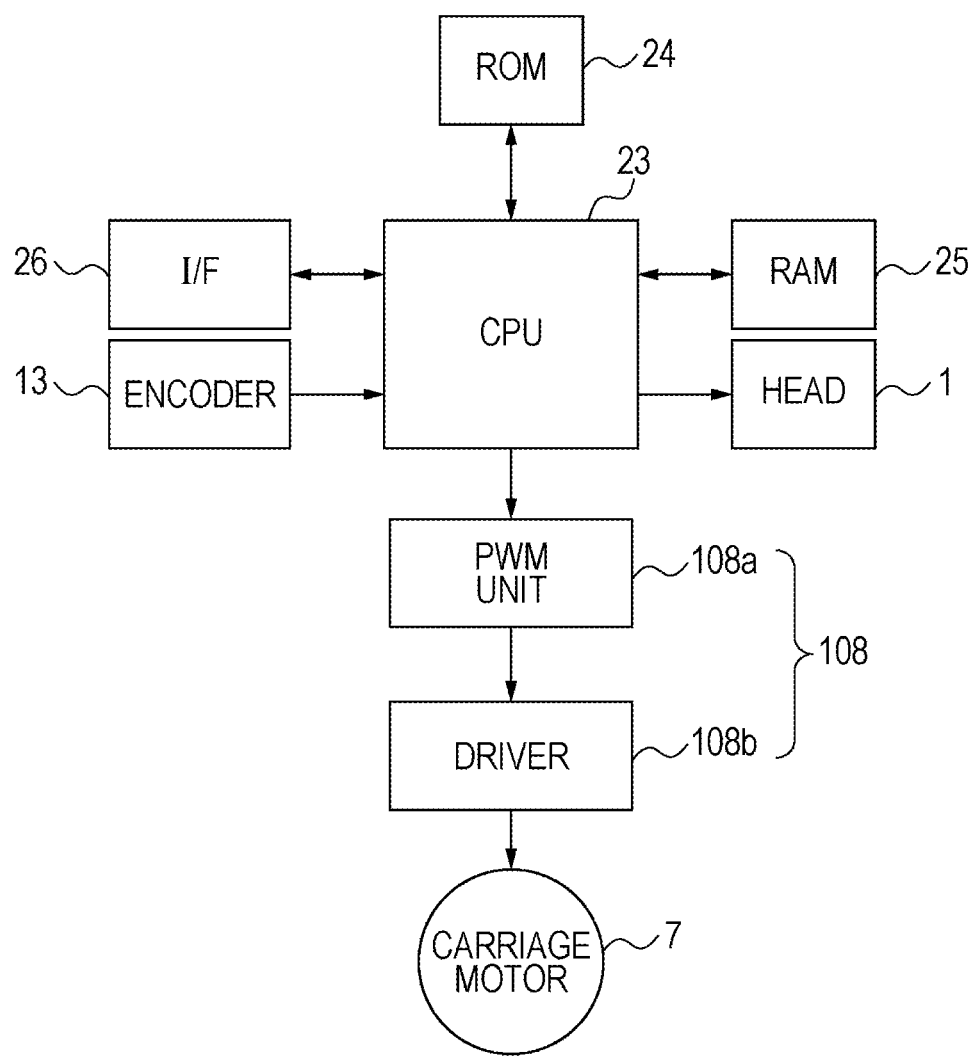
FIG. 5 is a control block diagram of the recording apparatus.

FIG. 5 is a schematic view of the control unit of the main substrate. In this control unit, a CPU 23 reads out a program stored in a ROM 24, and executes the program. The CPU 23 controls execution of an identification process that will be described below. The CPU 23 controls an integrated circuit (ASIC) (not shown) so as to control image processing for processing print data, communication with the host computer via an interface (IF) 26, and driving of the recording head 1. In addition, the CPU 23 controls processing of signal output from the encoder sensor 13 and signal output to the motor driver 108b. The CPU 23 may be replaced with an ASIC including the CPU 23 and other circuits. A RAM 25 stores a result of image processing, speed information, information about the speed variation, and a result of operation for acquiring the periodic signal. The PWM unit 108a generates a signal for modulating a pulse voltage width on the basis of the information operated in the CPU 23. The motor driver 108b is a driver circuit for driving the motor 7 according to a signal output from the PWM unit 108a.

First Embodiment

Figure 3:
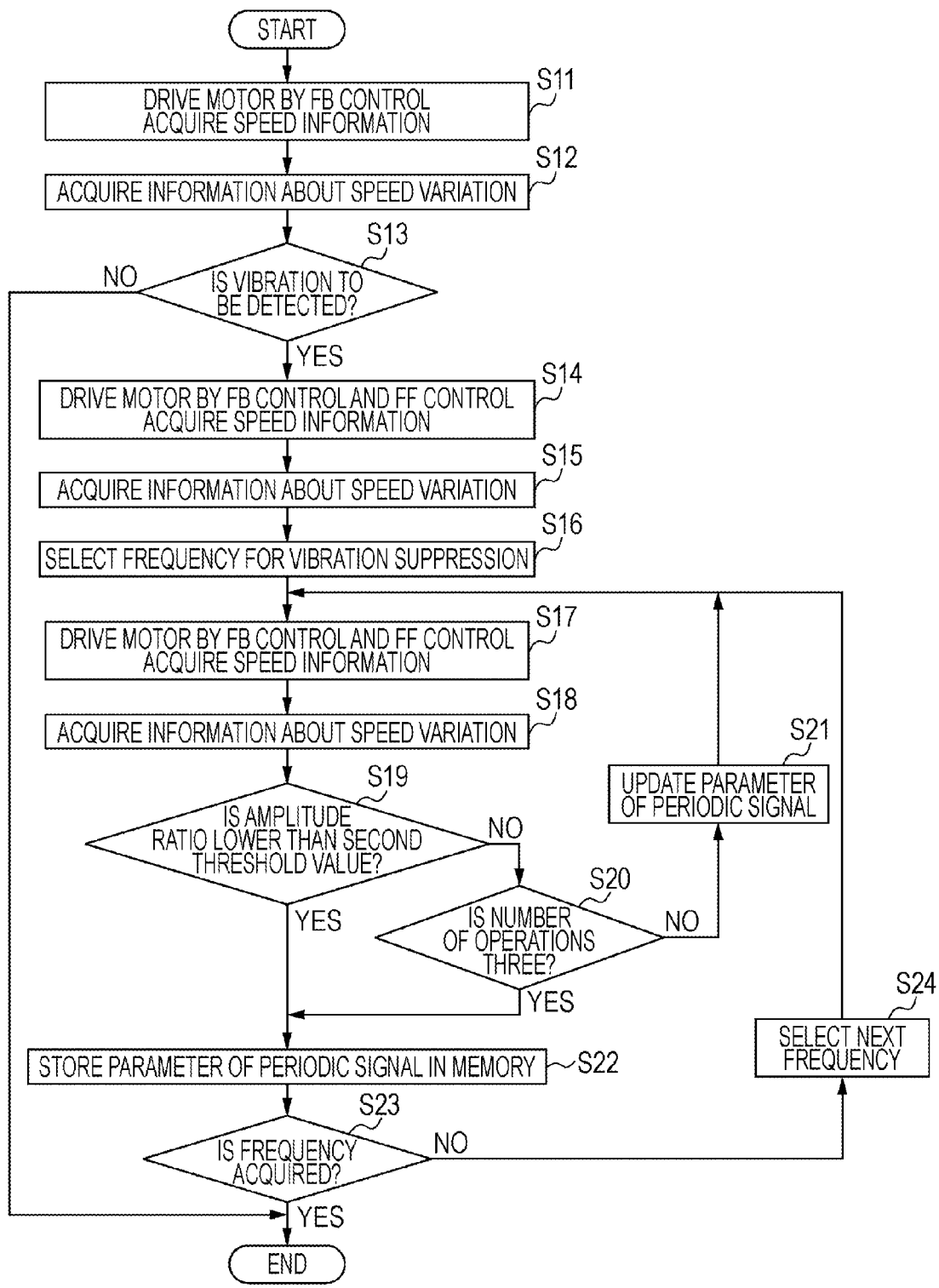
FIG. 3 illustrates a control process according to a first embodiment.
Figures 4A, 4B, 4C:
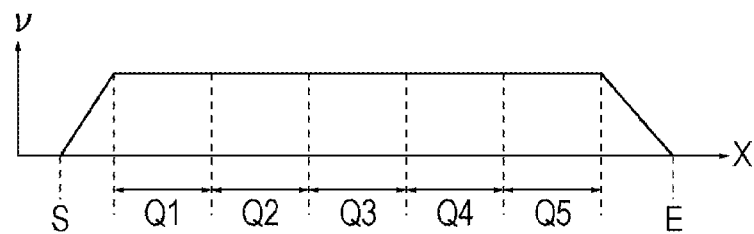
FIG. 4A shows speed variation information acquired in scanning areas.
FIG. 4B illustrates an example of a threshold value table.
FIG. 4C illustrates scanning areas of a carriage.

An identification process (preliminary driving process) will be described with reference to FIG. 3. In Step S11, motor driving is performed by FB control, and speed information about the carriage (moving body) is acquired. As shown in FIG. 4C, the carriage moves from a position S to a position E. FB control is performed so that the carriage scans at a constant scanning speed through areas Q1 to Q5. In this case, the scanning speed is a speed adopted in a print operation. In Step S12, information about speed variation of the carriage (first amplitudes) is acquired. As shown in FIG. 4A, first amplitudes are obtained in the areas Q1 to Q5 of the carriage. In the first embodiment, the number of areas is five for plain explanation. FIG. 4B is an example of a threshold value table. In the first embodiment, the threshold value table contains columns corresponding to three frequencies.

In the first embodiment, information about speed variation at three frequencies is acquired for plain explanation. FIG. 6 illustrates extraction examples of two frequencies of 100 Hz and 120 Hz from one piece of information about speed variation. Similarly, information is acquired for three frequencies by the band-pass filter.

In Step S13, it is determined whether to detect vibration. This determination is made by comparing the three frequencies acquired in Step S12 with corresponding threshold values. First threshold values in FIG. 4B serve as threshold values used to determine whether to detect vibration. In the first embodiment, when at least one of the frequencies is higher than (higher than or equal to) the corresponding first threshold value, the process proceeds to Step S14 (YES). In contrast, when all frequencies are lower than the corresponding first threshold values, it is determined that vibration is not to be detected (NO), and the process is finished. Since the sixth-order motor cogging frequency and twelfth-order motor cogging frequency are higher than the first threshold values in this case, vibration detection is performed for these two frequencies.

In Step S14, motor driving is performed by FB control and FF control, and speed information about the moving body is acquired. For this FF control, a signal is generated by combining a periodic signal corresponding to the sixth-order motor cogging frequency and a periodic signal corresponding to the twelfth-order motor cogging frequency. The parameter (e.g., amplitude) of the combined signal is a preset value. The phase of this signal differs by $2\pi \times 1/6$ among the areas Q1 to Q5, as shown in FIG. 4A. For example, a periodic signal having a phase of $2\pi \times 1/6$ is output in the first area Q1 from the start, and a periodic signal having a phase of $2\pi \times 2/6$ is output in the next area Q2.

In Step S15, information about speed variation of the moving body (second amplitudes) is acquired. The second amplitudes shown in FIG. 4A indicate amplitude of speed variation in driving performed in Step S14. Then, the ratio of the first amplitude and the second amplitude is found in each area. As the amplitude ratio decreases, the degree of suppression of speed variation by the periodic signal increases. Referring to FIG. 4A, the amplitude ratio in the area Q1 is 0.69, which is the lowest of the five amplitude ratios. In Step S15, an amplitude ratio of the sixth-order motor cogging frequency and an amplitude ratio of the twelfth-order motor cogging frequency in the area Q4 are also acquired.

In Step S16, a frequency to be suppressed is selected. On the basis of the amplitude ratio of each frequency to be suppressed and the second threshold value shown in FIG. 4B, it is determined whether to perform processing for vibration suppression. The second threshold value is used to determine whether to perform vibration suppression. Since the amplitude ratio of the sixth-order motor cogging frequency is higher than the second threshold value in this case, the sixth-order motor cogging frequency is subjected to processing for vibration suppression. In contrast, processing for vibration suppression is not performed for the 12-order motor cogging frequency.

In Step S17, motor driving is performed by FB control and FF control using the periodic signal, and speed information is acquired. In this case, a periodic signal having a predetermined amplitude is generated corresponding to the sixth-order motor cogging frequency. The phase of the periodic signal is similar to that acquired in Step S14. In Step S18, speed variation information (second amplitude) and an amplitude ratio of the sixth-order motor cogging frequency are obtained from the speed information acquired in Step S17.

In Step S19, determination is made using the second threshold value. When the amplitude ratio is lower than the second threshold value, the process proceeds to Step S22 (YES). In contrast, when the amplitude ratio is higher than or equal to the second threshold value, the process proceeds to Step S20 (NO). In Step S20, the number of times Steps S17 to S19 are performed is counted. The process proceeds to Step S22 (YES) when the count number is three, and to Step S21 (NO) when the count number is not three. In Step S21, Step S17 is performed again by changing the amplitude. The amplitude value for this purpose is prepared beforehand.

In Step S22, the parameter of the periodic signal is stored in the frequency table. In this case, a parameter of the sixth-order motor cogging frequency is stored and a flag is set on in the frequency table. In Step S23, it is determined whether or not the frequency to be subjected to processed is acquired. When acquisition is completed (YES), the process is finished. When acquisition is not completed, processing is performed for the next frequency in Step S24. Further to that, in the identification process, the flag corresponding to the frequency lower than the threshold value (frequency that does not need a periodic signal) is set off in the frequency table.

The above process will be roughly described below. In Steps S11 and S13, it is determined whether to perform processing for vibration suppression, and the frequency to be measured is selected. In Steps S14 to S16, the frequency to be suppressed is selected. In Steps S17 to S22, the parameter of the periodic signal of the selected frequency is specified, and the specified parameter is stored in the memory.

Further to Steps S17 to S22, the specified parameter is used to specify parameters of other frequencies. For example, in a case in which there are a plurality of frequencies to be suppressed (100 Hz and 120 Hz), as shown in FIG. 6, and the frequencies influence each other, Step S17 is first performed while reflecting a parameter of a periodic signal for the frequency of 100 Hz having a larger amplitude. Then, a parameter of a periodic signal for the frequency of 120 Hz is specified. This procedure can shorten the processing time.

Next, when the recording apparatus carries out a print (recording) operation, the signal generating unit 100 acquires a parameter of a frequency having an ON flag in the frequency table so as to generate a periodic signal. For example, when the flag of the sixth-order motor cogging frequency and the flag of the twelfth-order motor cogging frequency are on, a periodic signal is generated using the parameters corresponding to the sixth-order motor cogging frequency and the twelfth-order motor cogging frequency, of the three frequencies. Hence, for example, the signal generating unit 100 includes a signal synthesizing section for synthesizing a signal of the sixth-order motor cogging frequency and a signal of the twelfth-order motor cogging frequency.

First Modification of First Embodiment

Next, a description will be given of a first modification of the first embodiment. In the above-described first embodiment, the parameter of the periodic signal used for FF control in Step S14 is registered in the frequency table provided in the signal generating unit 100. In the first modification, a parameter stored in a separate memory, such as a nonvolatile memory (flash memory), may be used. The parameter can be stored in the nonvolatile memory via an interface of the recording apparatus.

Second Modification of First Embodiment

Next, a description will be given of a second modification of the first embodiment. In the above-described first embodiment, the phase of the periodic signal used in FF control in Steps S14 and S17 differs among the canning areas of the carriage. In the second modification, the same phase may be used, regardless of the area. This simplifies the configuration of the signal generating unit 100 for generating the periodic signal.

Third Modification of First Embodiment

Next, a description will be given of a third modification of the first embodiment. In the above-described first embodiment, information about speed variation is acquired by performing driving by FB control in Steps S11 to S13. In the third embodiment, Steps S11 to S13 may be omitted, and the identification process may start from Step S14. In this modification, a threshold value different from the threshold values in FIG. 4B is prepared for each frequency. For example, a third threshold value relating to the amplitude of the speed variation may be provided to be used for comparison in Step S19.

Fourth Modification of First Embodiment

Next, a description will be given of a fourth modification of the first embodiment. When the recording apparatus includes a control unit that performs printing (recording) while selecting a first scanning speed or a second scanning speed different from the first scanning speed, the identification process (preliminary process) may be performed for each of the first scanning speed and the second scanning speed.

In this case, the number of areas and the scanning width described with reference to FIG. 4C may be determined in accordance with the scanning speed.

Fifth Modification of First Embodiment

Next, a description will be given of a fifth modification of the first embodiment. While the frequency table storing parameters and flags is provided in the periodic-signal generating unit 100 in the first embodiment, it may be provided in the RAM 25 as an example. In this case, the CPU 23 may read out a parameter of a frequency having an ON flag, and sets the value of the parameter in the periodic-signal generating unit 100.

Other Embodiments

While the embodiment and the modifications have been described above, the present invention is not limited to the above-described numerical values. For example, the frequencies included in the speed variation are not limited to the frequencies relating to the motor cogging and the timing belt, and may be a frequency relating to a motor pulley, a gear, or the like. Further, the frequency of motor cogging is not limited to the sixth-order frequency and the twelfth-order frequency, and for example, it may be a high-order (twenty-fourth-order) frequency or a low-order (e.g., second-order or third-order) frequency.

Further, the phase of the periodic signal does not always need to be changed in correspondence with the number of areas where speed information is acquired. Still further, the unit of change of the phase is not limited to $2\pi/6$, and it may be other values, for example, $2\pi/10$ and $2\pi/8$. The number of areas where speed information is acquired is not limited to five, and may be other numbers.

In addition, while the recording apparatus has been described as an example of an electronic apparatus, the present invention is also applicable to an image input apparatus for reading an image on a document by scanning a reading unit, and to various apparatuses (devices) for moving or rotating a driven object by a motor serving as a driving source. Further, the above-described embodiments may be combined.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-066510, filed Mar. 18, 2009, which is hereby incorporated by reference herein in its entirety.

The invention claimed is:

1. An electronic apparatus comprising:
a motor configured to drive a mechanism;
an encoder configured to output a signal in response to movement of the mechanism;
a control unit configured to execute feedback control over driving of the motor according to the signal and a command value;
a selection unit configured to select, on the basis of a threshold value relating to speed variation of the mechanism and threshold values relating to a plurality of frequencies that constitute the speed variation, a frequency to be measured and a frequency to be suppressed, from the plurality of frequencies;
a generation unit configured to generate a periodic signal including the frequency to be measured that is selected by the selection unit and a periodic signal including the frequency to be suppressed that is selected by the selection unit; and
an acquisition unit configured to output the periodic signal generated by the generation unit to the control unit and to acquire a parameter relating to the frequency included in the periodic signal.

2. The electronic apparatus according to claim 1, wherein the plurality of frequencies include a frequency corresponding to cogging of the motor.

3. The electronic apparatus according to claim 1, wherein the threshold value includes an amplitude of the speed variation.

4. The electronic apparatus according to claim 1, wherein the threshold value relates to a ratio of speed variation made when the periodic signal is applied and speed variation made when the periodic signal is not applied.

5. The electronic apparatus according to claim 1, wherein the parameter includes at least one of an amplitude and a phase.

* * * * *